United States Patent
Jung et al.

(10) Patent No.: US 7,856,291 B2
(45) Date of Patent: Dec. 21, 2010

(54) CLEANING ROBOT AND METHOD FOR CONTROLLING THE SAME

(75) Inventors: Yong Gyu Jung, Inchun-si (KR); Hyeong Shin Jeon, Kyungsangnam-do (KR)

(73) Assignee: LG Electronics Inc., Seoul (KR)

( * ) Notice: Subject to any disclaimer, the term of this patent is extended or adjusted under 35 U.S.C. 154(b) by 473 days.

(21) Appl. No.: 11/856,133

(22) Filed: Sep. 17, 2007

(65) Prior Publication Data
US 2008/0091303 A1 Apr. 17, 2008

(30) Foreign Application Priority Data
Oct. 13, 2006 (KR) .................. 10-2006-0099858

(51) Int. Cl.
*G05B 19/04* (2006.01)
*G01C 22/00* (2006.01)

(52) U.S. Cl. .................. 700/258; 700/250; 701/23; 73/649; 73/40.5; 367/20; 367/98; 367/104; 901/47

(58) Field of Classification Search .................. 367/98, 367/104, 20; 15/49.1; 73/40.5 A
See application file for complete search history.

(56) References Cited

U.S. PATENT DOCUMENTS

| | | | | |
|---|---|---|---|---|
| 4,789,970 A | * | 12/1988 | Levallois | 367/104 |
| 5,319,611 A | * | 6/1994 | Korba | 367/98 |
| 6,366,380 B1 | * | 4/2002 | Chesavage | 398/117 |
| 6,594,844 B2 | * | 7/2003 | Jones | 15/49.1 |
| 6,870,792 B2 | * | 3/2005 | Chiappetta | 367/98 |
| 7,103,449 B2 | * | 9/2006 | Woo et al. | 700/251 |
| 7,320,149 B1 | * | 1/2008 | Huffman et al. | 15/320 |
| 7,397,213 B2 | * | 7/2008 | Im et al. | 318/568.12 |
| 7,480,958 B2 | * | 1/2009 | Song et al. | 15/319 |
| 7,499,375 B2 | * | 3/2009 | Heimberger et al. | 367/98 |
| 2006/0237634 A1 | * | 10/2006 | Kim | 250/221 |
| 2006/0260090 A1 | | 11/2006 | Kim | |
| 2007/0035457 A1 | | 2/2007 | Sung et al. | |
| 2007/0039293 A1 | | 2/2007 | Baek et al. | |
| 2007/0100501 A1 | | 5/2007 | Im et al. | |
| 2007/0214601 A1 | | 9/2007 | Chung et al. | |

FOREIGN PATENT DOCUMENTS

| | | | |
|---|---|---|---|
| KR | 20-0412601 | | 3/2006 |
| KR | 20412601 | * | 3/2006 |

* cited by examiner

*Primary Examiner*—Thomas G Black
*Assistant Examiner*—Lin B Olsen
(74) *Attorney, Agent, or Firm*—Birch, Stewart, Kolasch & Birch, LLP

(57) ABSTRACT

A cleaning robot may be provided having a case and a sensor assembly. The sensor assembly may include a sensor hole having a first opening provided at an outer surface of the case and a second opening provided inwardly of the first opening, with respect to a center of the case. Additionally, the sensor assembly may include a sensor element configured to receive a signal and the sensor element may be provided inwardly of the first opening.

12 Claims, 15 Drawing Sheets

Radiation range of conventional ultrasonic sensor

Radiation range of present invention ultrasonic sensor

CLEANING ROBOT AND METHOD FOR CONTROLLING THE SAME

This application claims the benefit of Korean Patent Application No. 10-2006-0099858, filed on Oct. 13, 2006, the entire contents of which are hereby incorporated by reference in its entirety.

BACKGROUND OF THE INVENTION

1. Field of the Invention

The present invention relates to a cleaning robot and a method for controlling the same. More particularly, the present invention relates to a cleaning robot which easily discriminates or (discerns) between a signal reflected from an obstacle and a direct noise, and a method for controlling the same.

2. Description of the Conventional Art

A cleaning robot is a kind of mobile robot which absorbs dust and foreign material while moving by itself in a certain space such as a house or an office.

The aforementioned cleaning robot includes a traveling means including right and left wheel motors for moving the cleaning robot, a detection sensor for detecting and avoiding a variety of obstacles within a cleaning area, and a control means for controlling the traveling means and the detection sensor to perform cleaning, as well as the components of a general vacuum cleaner which absorbs dust and foreign material.

FIG. 17 is a schematic view of an ultrasonic sensor of a cleaning robot according to the conventional art. FIG. 18 is a graph illustrating signals obtained by the ultrasonic sensor of FIG. 17.

As illustrated in FIGS. 17 and 18, the cleaning robot according to the conventional art includes a case 1 and an ultrasonic sensor installed on the surface of the case 1. The ultrasonic sensor includes a transmitter portion 2 and receiver portion 3.

The transmitter portion 2 and the receiver portion 3 are installed spaced by a predetermined distance from each other, and recognizes obstacles 5 and 6 by receiving an ultrasonic wave transmitted from the transmitter portion 2.

If the transmitter portion 2 transmits a predetermined ultrasonic wave, this generates a direct noise 7 flowing along the case 1, as well as the ultrasonic wave transmitted to the outside of the case 1.

However, as illustrated in FIG. 18, there is a problem that the receiver portion 3 is unable to discriminate (or discern) between the direct noise 7 and an obstacle signal 8 that are received at a similar time because the receiver portion 3 receives the direct noise 7 transmitted along the surface of the case 1 and the signal 8 reflected from the spaced obstacle 5.

Therefore, the cleaning robot according to the conventional art has the problem of not being able to recognize the obstacle 5 as far as the position spaced by a predetermined distance from the case 1 due to the direct noise 7.

SUMMARY OF THE INVENTION

In one aspect of the present invention, a cleaning robot is provided which easily discriminates or discerns between a signal reflected by an obstacle and a direct noise, and a method for controlling the same. In this regard, the cleaning robot may dissolve (or eliminate) an obstacle un-measurable area by discriminating (or discerning) between a direct noise and an obstacle signal, and a method for controlling the same. More particularly, the cleaning robot may be provided having a sensor hole disposed or provided so as to reduce the amplitude of a direct noise as compared to a signal reflected from an obstacle.

In one non-limiting embodiment, the cleaning robot may include a case and a sensor assembly. The sensor assembly may include a sensor hole having a first opening provided at an outer surface of the case and a second opening provided inwardly of the first opening, with respect to a center of the case. Additionally, the sensor assembly may also include a sensor element configured to receive a signal. Further, the sensor element may be provided inwardly of the first opening.

In an additional aspect, the sensor hole may include a sensor mount provided at the second opening, and the sensor element may be provided at the sensor mount. Additionally, the sensor element may include plurality of sensor elements including a transmitter and a receiver. In this regard, the sensor hole may include a plurality of sensor holes having corresponding sensor mounts, and the transmitter and receiver may be provided at a corresponding sensor mount.

In an additional aspect, the sensor hole may also include a sensor wall extending inwardly from the first opening to the second opening, an outer end of the sensor wall opening to an outer side of the case, and an inner end of the sensor wall opening to an interior of the case. Additionally, the sensor hole may also include a sensor mount provided at the second opening. In this regard, the sensor wall may be communicatingly connected to the sensor mount and second opening.

In yet still another aspect, the second opening may have a cross-sectional area which is smaller than a cross-sectional area of a mount opening of the sensor mount. Additionally, Hh may define a minimum distance from the first opening to the second opening, ds may define a diameter of the sensing element, and the ratio Hh/ds may be about 1.1 to about 1.8. In a further feature, the slope of the sensor wall, with respect to an axis passing through the centers of the first and second openings, may be about 0.0 to about 18.0 degrees.

According to another aspect, dh may define a diameter of the second opening, ds may define a diameter of the sensing element, and the ratio dh/ds of the sensor may be about 0.3 to about 1.0. Additionally, a cross-sectional area of the sensor hole may increase as the sensor hole extends from the second opening towards the first opening. Further, the case may have a generally circular shape. Additionally, at least a portion of the sensor hole may have a truncated generally conical shape.

In an additional aspect, the sensor hole may include a plurality of sensor holes spaced at an interval and positioned at a predetermined angle with respect to the case. In yet still another feature, the sensor hole may be formed integral with the case. Additionally, the sensor hole may be mounted to the case.

According to another feature, the sensor hole may protrude outside of the case. Additionally, the sensor element may be an ultrasonic sensor. Further, at least one of the transmitter and the receiver may be provided inwardly of the first opening. Thus, in accordance with the non-limiting features of the present invention, the sensor hole may be configured to restrict a radiation range of the predetermined signal.

In another non-limiting embodiment, a method for controlling a cleaning robot, may include providing a case having a sensing element, the sensing element may include a transmitter configured to transmit a signal and a receiver configured to receive a transmitted signal. Additionally, the controlling method may include comparing the amplitude of the transmitted signal received by the receiver to a predetermined level. In this regard, it may be determined that the transmitted signal is a signal reflected by an obstacle when the amplitude of the transmitted signal is greater than the predetermined level, and that the signal is a direct noise when the amplitude of the transmitted signal is less than the predetermined level.

In an additional aspect, when a plurality of signals is inputted into the receiver and at least one of the plurality of input signals is higher than the predetermined level, the at least one of the input signals is determined to be a signal reflected from an obstacle. Additionally, the amplitude of the transmitted signal received by the receiver may be compared to a predetermined level, after a predetermined signal corresponding to the predetermined level is transmitted by the transmitter.

BRIEF DESCRIPTION OF THE DRAWINGS

The present invention is further described in the detail description which follows, in reference to the noted plurality of drawings, by way of non-limiting examples of preferred embodiments of the present invention, in which like characters represent like elements throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Several non-limiting embodiments of a cleaning robot according to the present invention are explained hereinafter.

Figure 1:
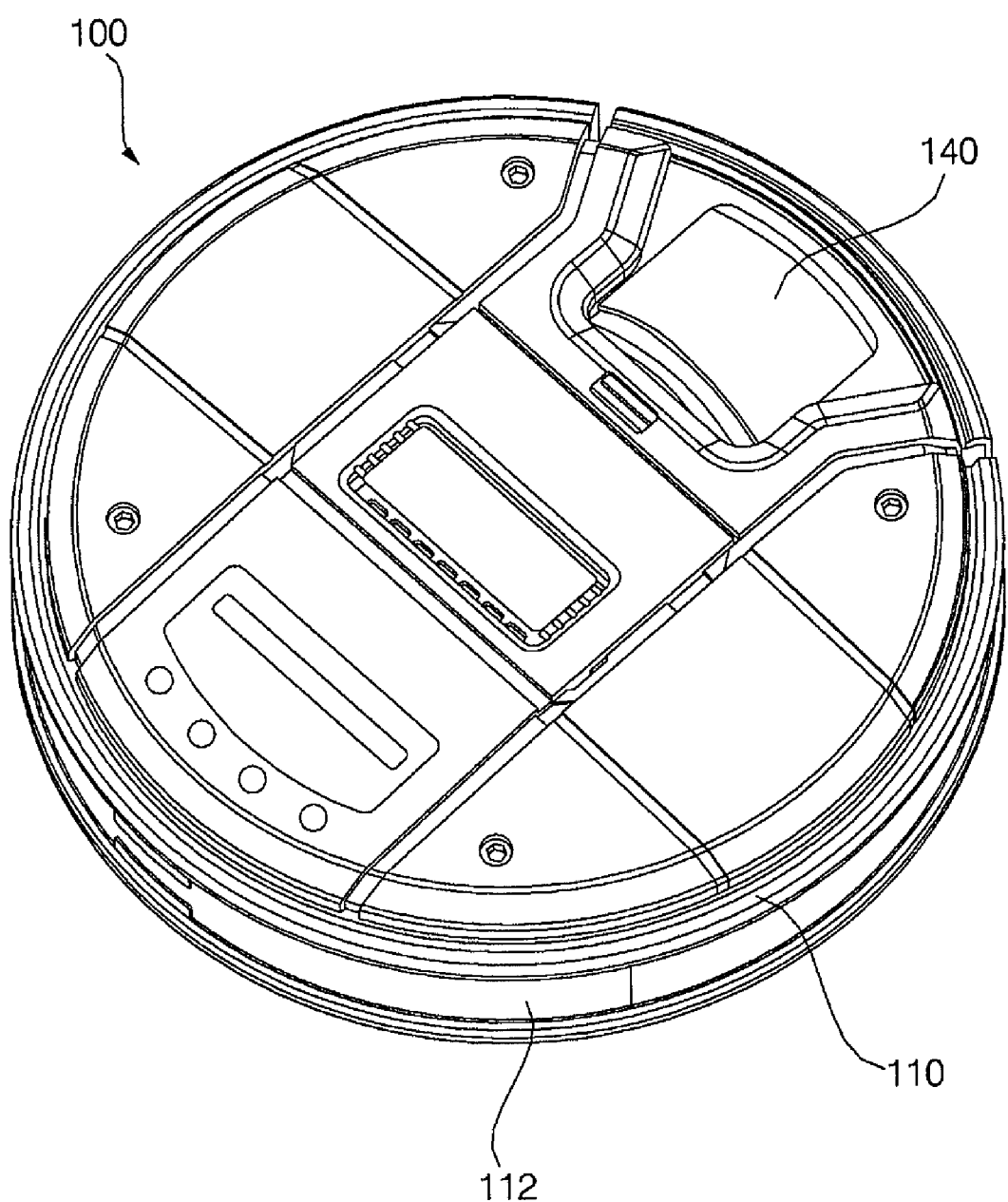
FIG. 1 is a perspective view illustrating a cleaning robot according to a first embodiment of the present invention.
Figure 2:
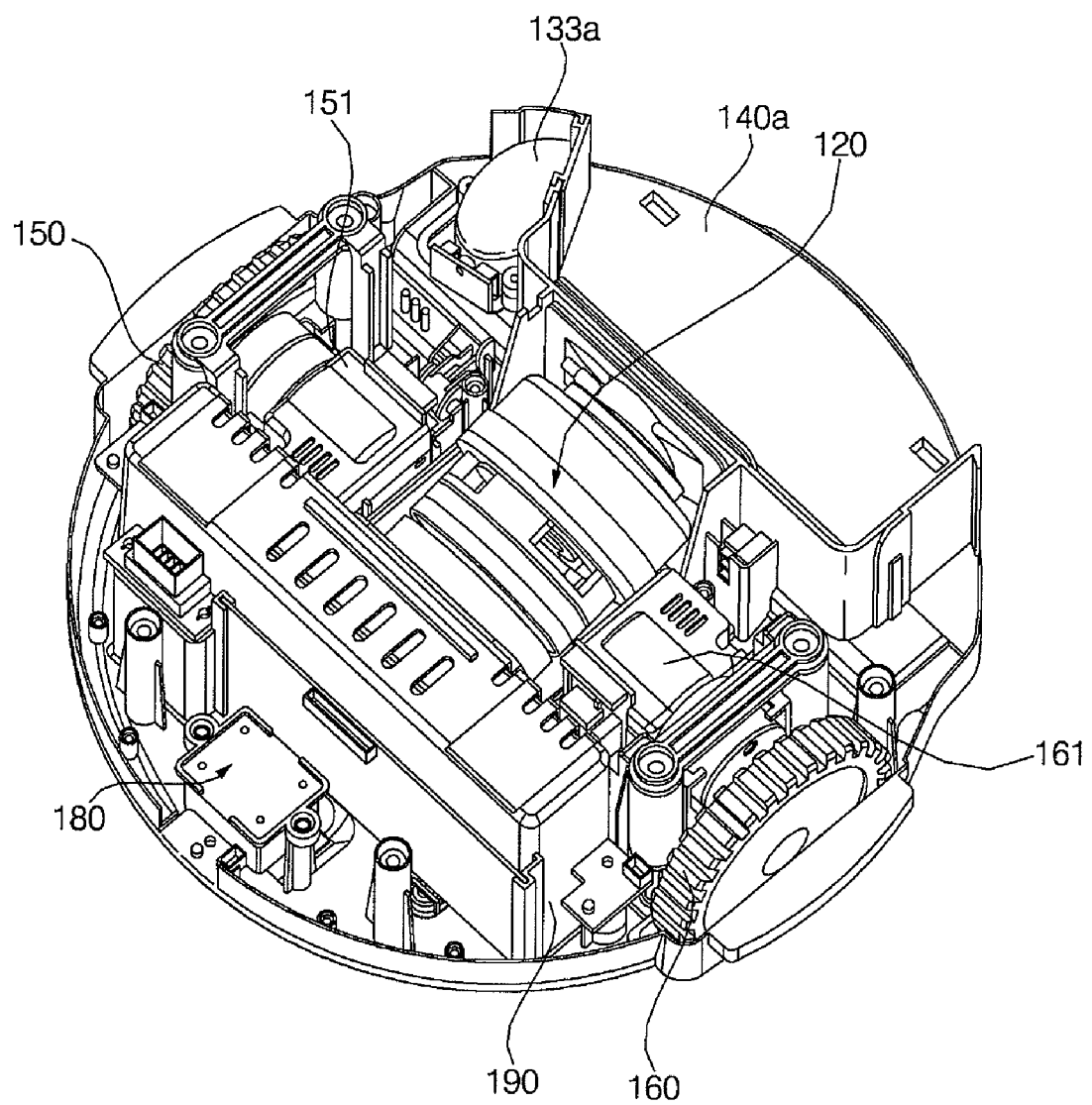
FIG. 2 is a perspective view illustrating an internal structure of the cleaning robot as illustrated in FIG. 1.
Figure 3:
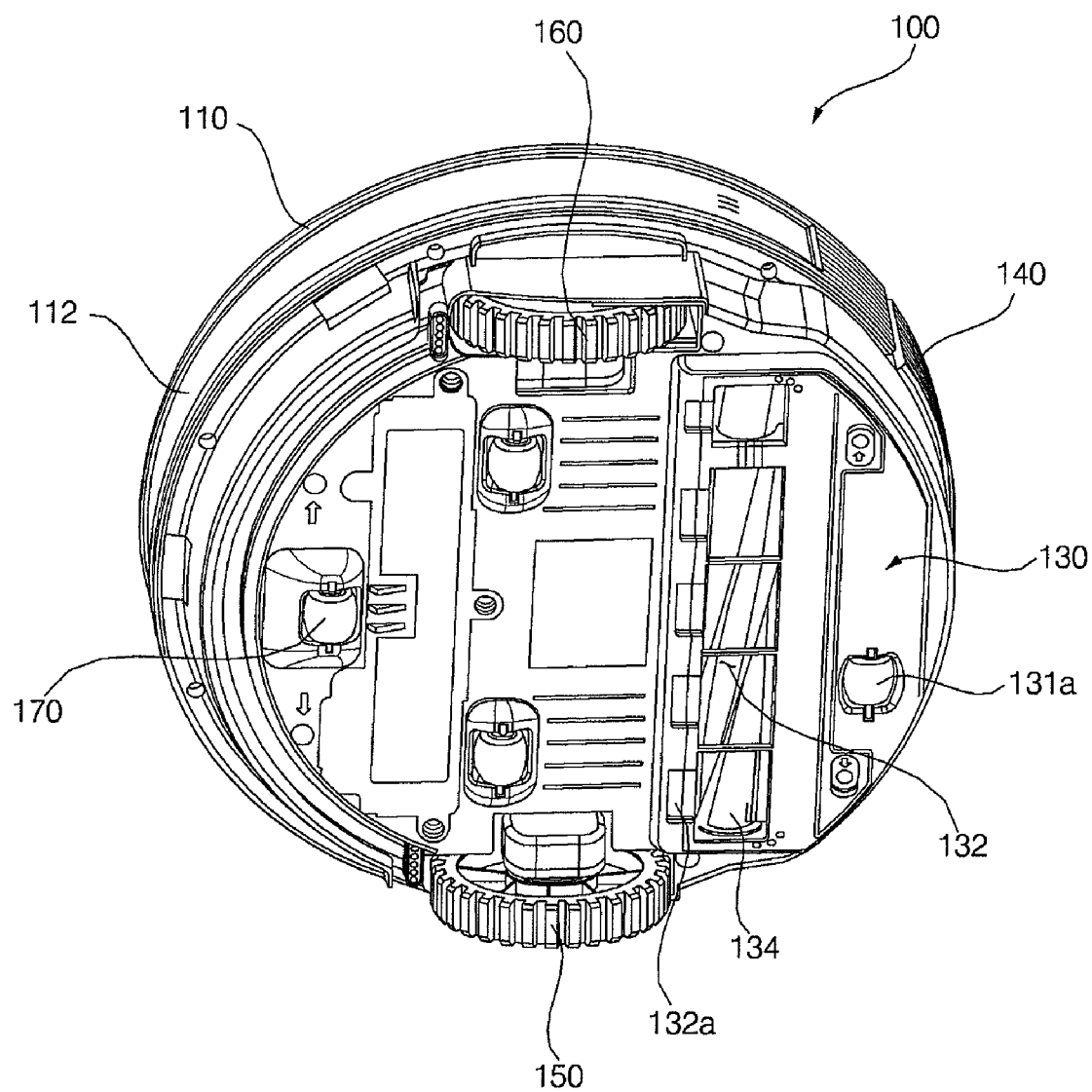
FIG. 3 is a perspective view illustrating the bottom part of the cleaning robot as illustrated in FIG. 1.

FIG. 1 is a perspective view illustrating a cleaning robot according to a first embodiment of the present invention. FIG. 2 is a perspective view illustrating an internal structure of the cleaning robot as illustrated in FIG. 1. FIG. 3 is a perspective view illustrating the bottom part of the cleaning robot as illustrated in FIG. 1.

As illustrated in FIGS. 1 to 3, the cleaning robot 100 may include a case 110 forming the outer appearance (e.g., the exterior of the case), an air suction device 120 installed inside the case 110, the air suction device 120 may be configured to suction air at the lower part of the case 110 and to discharge the air out of the case 110, a suction nozzle unit 130 may be installed on the case 110 and connected to the air suction device 120. The air suction device 120 may have an agitator 134 installed therein for providing a flow path for suctioning external air and floating dust on the floor, and a dust collector for separating foreign material suctioned by the suction nozzle unit 130 from air and collecting the dust.

The case 110 may be formed in a generally round disk (or circular) shape having a predetermined height.

The air suction device 120, the suction nozzle unit 130, and the dust collector 140 which communicates with the suction nozzle unit 130 may be provided inside the case 110.

In addition, a sensor (not shown) for sensing the distance to an indoor wall or an obstacle and a bumper 112 for cushioning a shock upon collision may be provided on the case 110. Left and right driving wheels 150 and 160 for moving the cleaning robot 100 may be provided at lower parts of the case 110, respectively.

The left and right driving wheels 150 and 160 may be configured to rotate by a left wheel motor 151 and a right wheel motor 161 that are controlled by a controller 180. The cleaning robot moves forward and backward, turns, and rotates depending on the rotation direction and rotation ratio of the left and right wheel motors 151 and 161.

At least one auxiliary wheel 170 may be provided on the bottom of the case 110, thereby preventing the bottom surface of the case 110 from direct contact with the floor thereby minimizing friction between the cleaning robot and the floor.

The internal construction of the cleaning robot 100 will be described in more detail. A controller 180 having various mounting parts disposed therein for controlling the driving of the cleaning robot 100 may be provided at the front side of the case 110, and a battery 190 for supplying power to each part of the cleaning robot may be provided at the rear side of the controller 180.

The air suction device 120 which generates an air suction force may be installed at the back of the battery 190, and a dust collector mounting portion 140a may be installed at the back of the air suction device so as to install the dust collector 140 thereon. The dust collector 140 may be structured such that it is fixed to the dust collector mounting portion 140a. For example, the dust collector 140 may be detachably connected to the mounting portion 140a The suction nozzle unit 130 may be provided at the lower side of the dust collector 140, thereby suctioning air and foreign material on the floor.

The air suction device 120 may include a motor (not shown) installed between the battery 190 and the dust collector 140 and electrically connected to the battery 190 and a fan (not shown) connected to a rotary shaft of the motor for forcing an air flow.

The suction nozzle unit 130 may be installed so as to face the bottom of the case 110 so that a suction port 132 is exposed to the lower side of the case 110.

As discussed above, the suction nozzle unit 130 may suction foreign material on a surface, e.g., on the floor of an indoor space, and will be described in more detail with reference to FIGS. 4 and 5.

Figure 4:
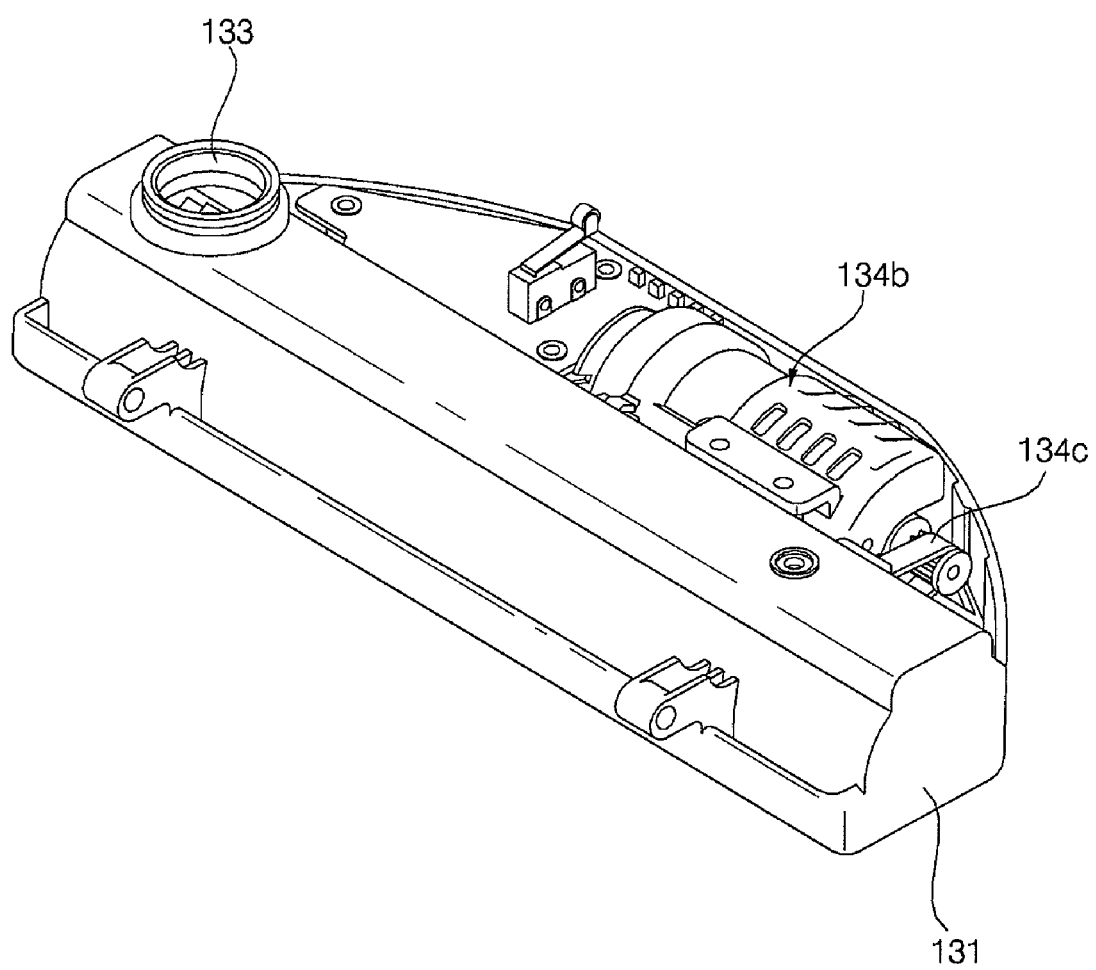
FIG. 4 is a top perspective view illustrating a suction nozzle unit of the cleaning robot as illustrated in FIG. 1.
Figure 5:
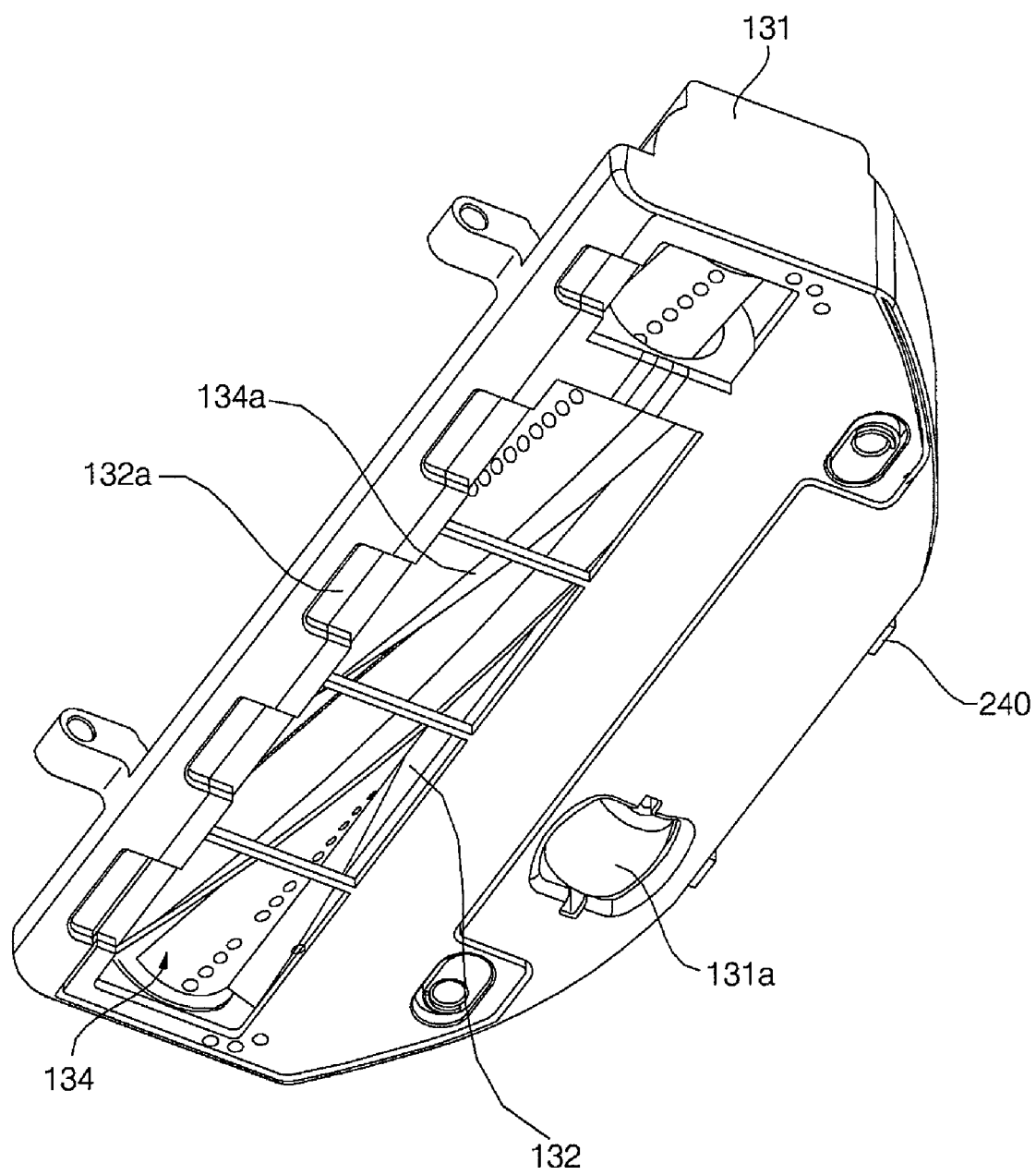
FIG. 5 is a bottom perspective view illustrating a suction nozzle unit of the cleaning robot as illustrated in FIG. 1.
Figure 6:
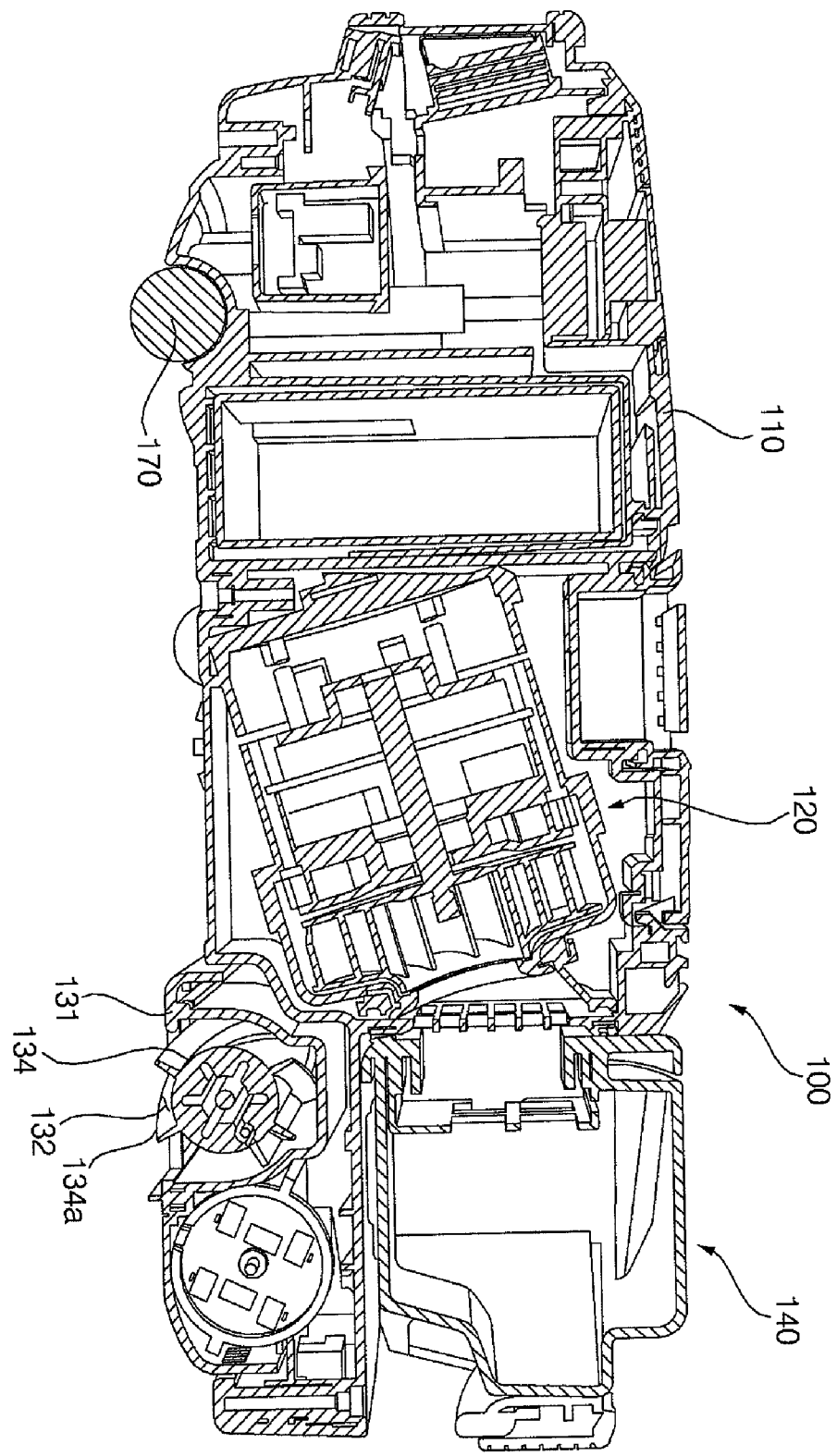
FIG. 6 is a cross sectional view of the cleaning robot as illustrated in FIG. 1.

FIG. 4 is a top perspective view illustrating a suction nozzle unit 130 of the cleaning robot as illustrated in FIG. 1. FIG. 5 is a bottom perspective view illustrating a suction nozzle unit of the cleaning robot as illustrated in FIG. 1. FIG. 6 is a cross sectional view of the cleaning robot as illustrated in FIG. 1;

Referring to FIGS. 4 to 6, the suction nozzle unit 130 includes a nozzle case 131 having a suction port 132 and an exhaust port 133 formed therein. The nozzle case 131 and the suction port 132 are configured to be installed in the case 110, and an agitator 134 may be installed inside the nozzle case 131, i.e., at the suction port 132 side, for agitating dust on a surface (e.g., a floor).

The suction port 132 may be formed to communicate with the lower surface of the case 110, i.e., so as to face the floor, while the exhaust port 133 may be formed to communicate with the dust collector 140, thereby guiding the air sucked from the suction port 132 to the dust collector 140.

An auxiliary wheel 131a is installed on the lower surface of the nozzle case 1313 so as to prevent the suction port 132 from tightly contacting to the floor.

The suction port 132 suctions foreign material stacked on the floor by an air suction force generated by the air suction device 120, and the exhaust port 133 may be connected to the dust collector 140 through a communicating tube 133a.

A plurality of suction grooves 132a may be formed on the lower surface of the nozzle case 131 in a forward and backward traveling direction of the cleaning robot. The suction grooves 132a may form a passage which prevents the suction port 132 from being blocked by foreign material on the floor at the front of the nozzle case 131 a, thereby preventing an overload of the motor provided on the air suction device 120.

Both ends of the agitator 134 may be connected to both side walls of the suction port 132 so as to be rotatable, and rotates or angularly reciprocates so as to shake the dust off the floor or carpet and floating it in the air.

A plurality of blades 134a provided in a spiral direction may be formed on the outer circumferential surface of the agitator 134, and a brush may be installed between the blades 134a formed in a spiral shape.

For the operation of the agitator 134, an agitator motor 134b and a belt 134c functioning as power transmission equipment for transmitting power of the agitator motor 134b to the agitator 134 may be provided on the nozzle case 131.

When a rotation force of the agitator motor 134b is transmitted to the agitator 134 through the belt 134c, the agitator 134 may sweep the foreign material on the floor to the suction port 132 while rotating.

Figure 7:
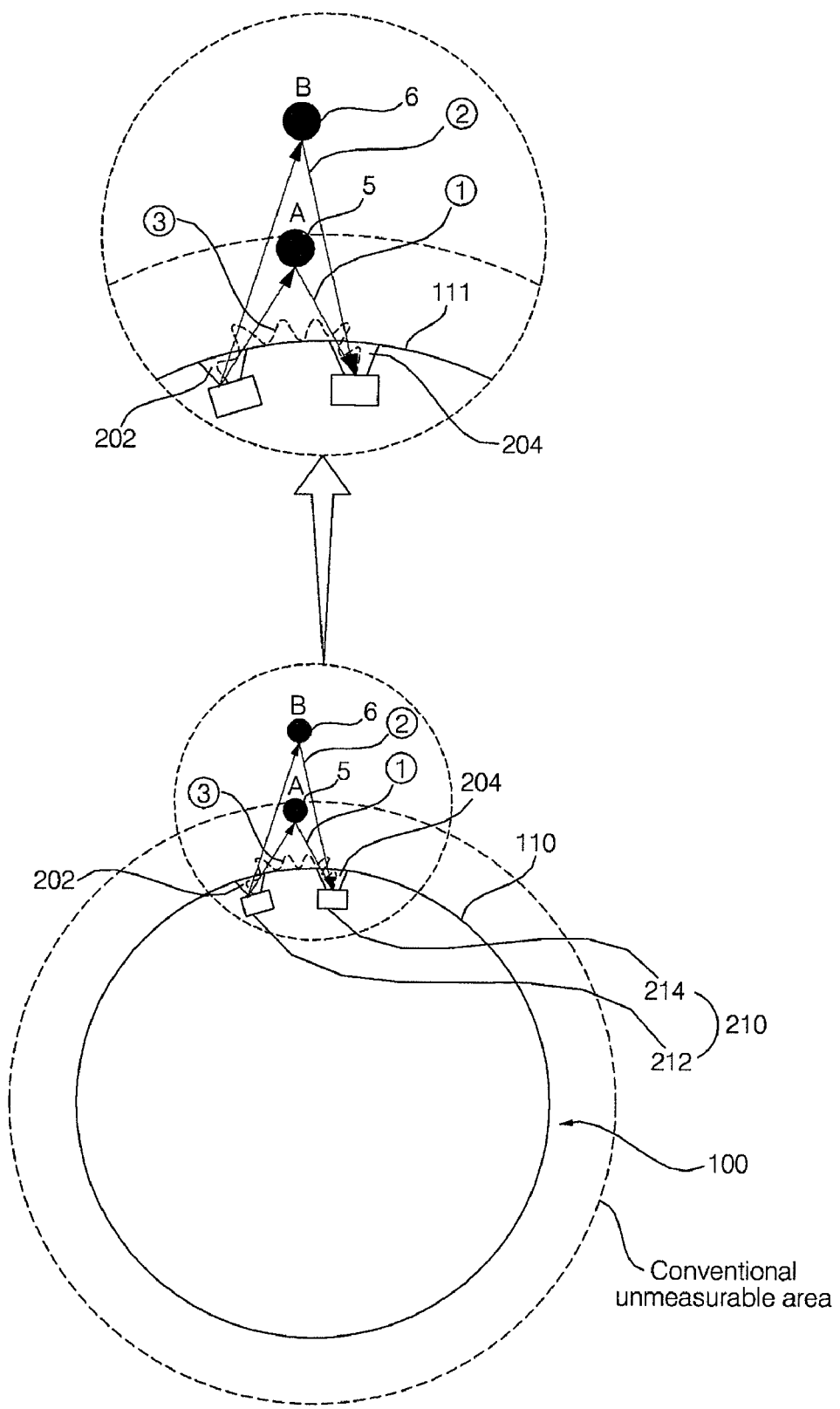
FIG. 7 is a schematic cross sectional view illustrating an ultrasonic sensor of the cleaning robot as illustrated in FIG. 1.
Figure 8:
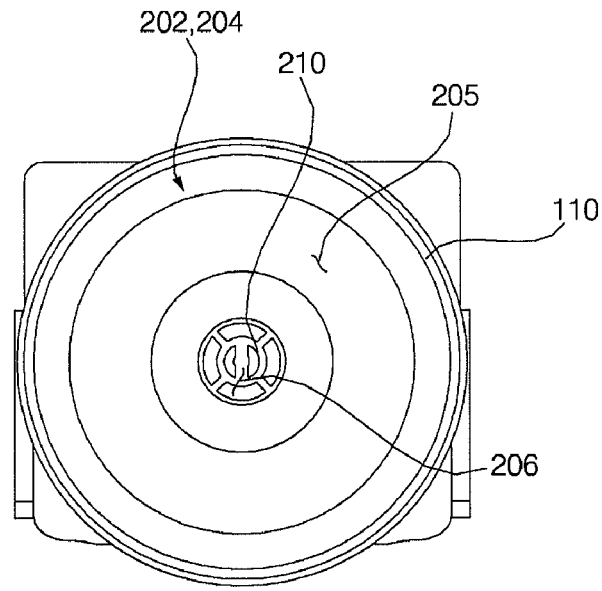
FIG. 8 is a front view of the ultrasonic sensor as illustrated in FIG. 7.
Figure 9:
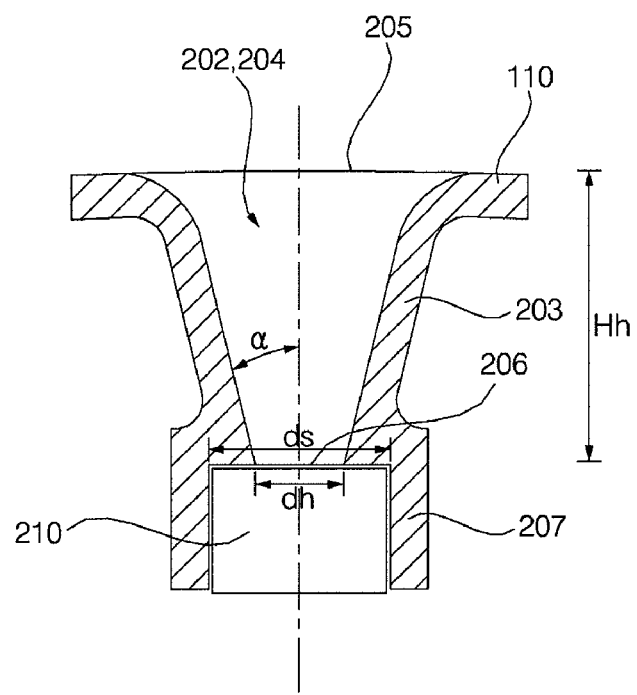
FIG. 9 is a cross sectional view of a sensor hole as illustrated in FIG. 7.

FIG. 7 is a schematic cross sectional view illustrating an ultrasonic sensor of the cleaning robot as illustrated in FIG. 1. FIG. 8 is a front view of the ultrasonic sensor as illustrated in FIG. 7. FIG. 9 is a cross sectional view of a sensor hole as illustrated in FIG. 7.

As illustrated in FIG. 7, sensor holes 202 and 204 may be formed concave inward and provided (or formed) on the case 110, and an ultrasonic sensor 210 used as a sensor unit (i.e., sensing element)_may be disposed on (or provided at) the sensor hole 202 in order to detect an obstacle to be found during the traveling of the cleaning robot 100.

The ultrasonic sensor 210 may include a transmitter 212 configured to generate an ultrasonic wave and a receiver 214 configured to receive the ultrasonic wave reflected from an obstacle 5.

The transmitter 212 and the receiver 214 may be installed (e.g., mounted or otherwise provided) at the sensor holes 202 and 204, respectively, formed (or provided) on the case 110.

As illustrated in FIGS. 7 to 9, the sensor holes 202 and 204 of the case 110 may be formed in a conical shape (e.g., a truncated generally conical shape) whose diameter increases as the sensor holes 202 and 204 extend toward the outside of the case. Additionally, the wall 203 which provides the sensor holes 202 and 204 with their conical shapes, may have a predetermined slope a with respect to the center of the sensor holes 202 and 204.

The ultrasonic sensor 210 may be installed on the sensor holes 202 and 204, the sensor holes 202 and 204 being configured to restrict the angle of a signal transmitted to or received from the ultrasonic sensor 210.

Therefore, the sensor holes 202 and 204 may be formed in such a shape in which the area of a cross section increases. For example, in one-limiting embodiment, the sensor holes 202 and 204 may be formed having a trumpet shape (e.g., a truncated generally conical shape) which may be formed at an angle of $2\alpha$.

The sensor holes 202 and 204 may include the sensor hole wall 203 being formed integrally with the case 110 and longitudinally extended to the inside, an outer opening 205 may be provided (or positioned) at the outer end of the sensor hole wall 203 and exposed to the outer surface of the case 110, an inner opening 206 may be provided (or positioned) at the inner end of the sensor hole wall 203 and formed at the inside of the case 110, and an installation portion (i.e., sensor mount) 207 may be connected to the inner end of the sensor hole wall 203 and provided with the ultrasonic sensor 210 installed therein.

The surface connecting the outer opening 205 to the inner opening 206 may be continually formed. The installation portion 207 may be stepped from the inner opening 206, and formed such that the transmitter 212 or receiver 214 of the ultrasonic sensor 210 can be inserted and fitted therein.

Therefore, the installation portion 207 may be wider than the inner opening 206. Additionally, the inner and outer openings 205 and 206, and the installation portion 207 may be formed integral with the case 110.

Here, the diameter of the inner opening 206 may be dh, the diameter of the transmitter portion 212 or receiver portion 214 of the ultrasonic sensor 210 may be ds, the shortest distance from the inner opening 206 to the outer opening 206 may be Hh, and the angle between the inner opening 206 and the outer opening 205 may be the slope $\alpha$.

Here, the diameter ds may be the diameter of the upper end of the ultrasonic sensor 210 contacting the inner opening 206. However it should be appreciated that the cross section of the ultrasonic sensor 210 may be provided having any suitable shape. For example, one of ordinary skill in the art would appreciate that the sensor 210 may have a square, rectangular, oval or any other suitable shape. Thus, in this case the term diameter may refer to an effective width (e.g., an average width) of the sensor 210)

Further, although the diameter ds may be used to represent the ultrasonic sensor 210 having a generally cylindrical shape, the diameter may be converted into a ratio equal to that of the cylindrical type and calculated even if the ultrasonic sensor 210 having a cubical or other shapes (e.g., an effective diameter).

For example, in the case where the ultrasonic sensor 210 is installed on the installation portion 207, the radiation range of a signal transmitted from the transmitter portion 212 and the range of a signal received by the receiver portion 214 decreases in comparison with the conventional art, and the amplitude of a direct noise directly transmitted to the receiver 214 from the transmitter 212 decreases.

At this time, the signal range of the ultrasonic sensor 210 may be related to the slope $\alpha$, and the wider the slope, the more advantageous it may be for measurement by the ultrasonic sensor 210.

Hence, this embodiment provides the range in which the angle of the slope $\alpha$ is the largest and the direct noise it the smallest.

Figure 10A:
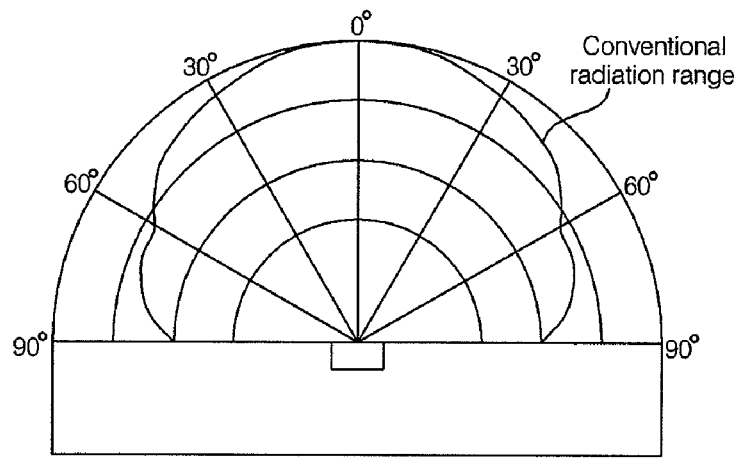
FIG. 10A is a view illustrating a radiation range of the ultrasonic sensor according to the conventional art.
Figure 10B:
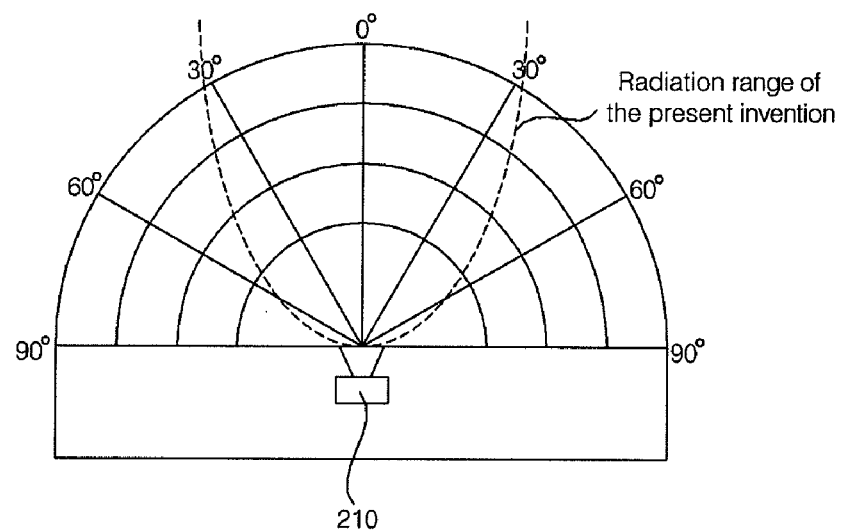
FIG. 10B is a view illustrating an radiation range of the ultrasonic sensor according to the present invention.
Figure 11:
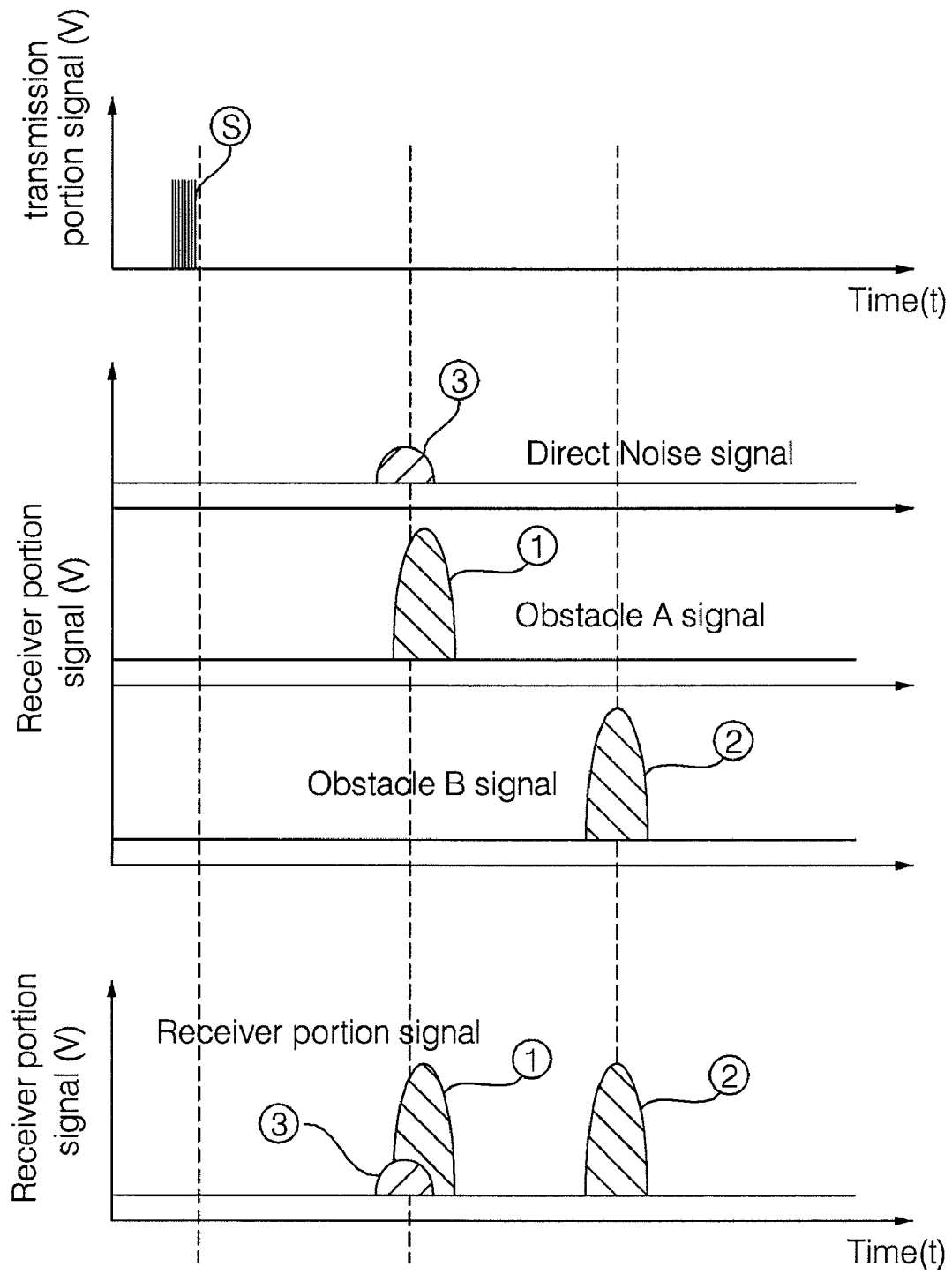
FIG. 11 is a graph illustrating a transmission signal and a reception signal of the ultrasonic sensor as illustrated in FIG. 7.
Figure 12:
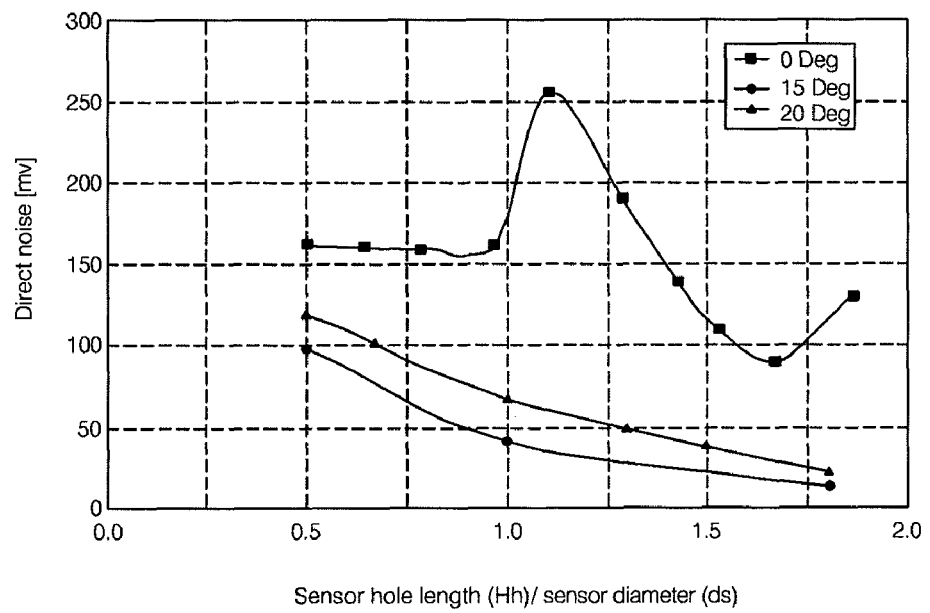
FIG. 12 is a graph illustrating a direct noise with respect to the diameter ds of the sensor and the depth Hh of the sensor hole as illustrated in FIG. 9.
Figure 13:
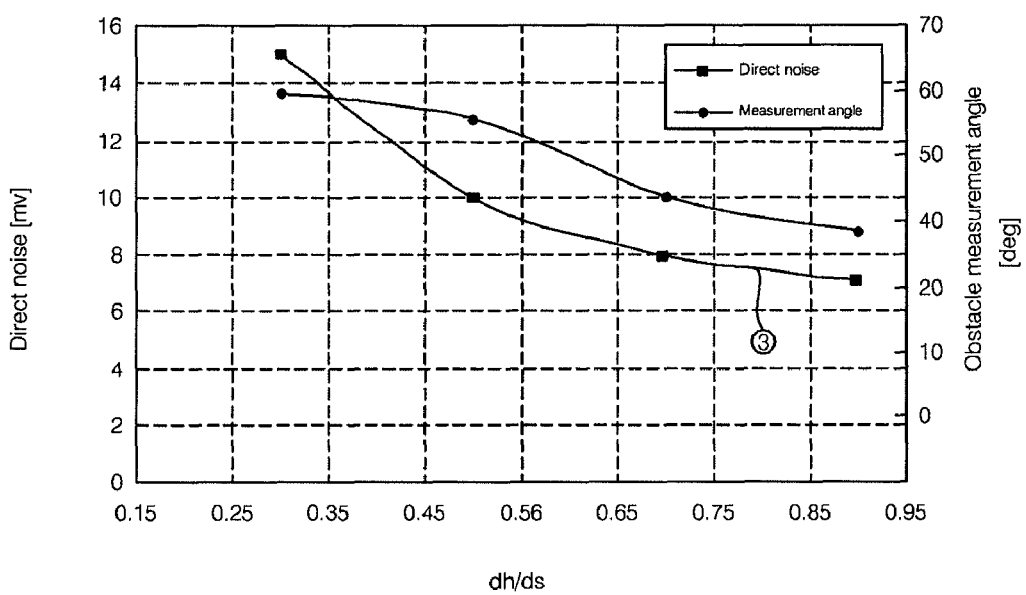
FIG. 13 is a graph illustrating a direct noise with respect to the diameter ds of the sensor and the diameter dh of an inner opening as illustrated in FIG. 9.
Figure 14:
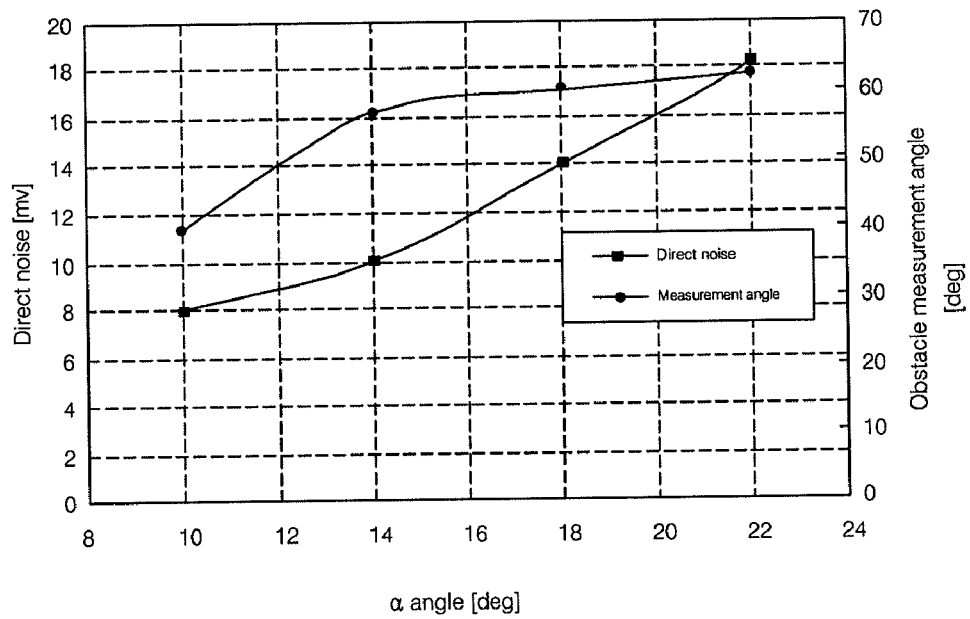
FIG. 14 is a graph illustrating a direct noise with respect to a slope a of the sensor hole as illustrated in FIG. 9.

FIGS. 10A and B are views illustrating a radiation range of the ultrasonic sensor according to the embodiment as illustrated in FIG. 7 and in the conventional art. FIG. 11 is a graph illustrating a transmission signal and a reception signal of the ultrasonic sensor as illustrated in FIG. 7. FIG. 12 is a graph illustrating a direct noise with respect to the diameter ds of the sensor and the depth Hh of the sensor hole as illustrated in FIG. 9. FIG. 13 is a graph illustrating a direct noise with respect to the diameter ds of the sensor and the diameter dh of an inner opening as illustrated in FIG. 9. FIG. 14 is a graph illustrating a direct noise with respect to $\alpha$ slope a of the sensor hole as illustrated in FIG. 9.

As illustrated in FIG. 7, the ultrasonic sensor 210 according to this embodiment may be inserted and installed into a sensor installation portion 207 of the sensor holes 202 and 204. Since an opened area of the sensor holes 202 and 204 may be restricted, orientation may be given to a signal transmitted from the ultrasonic sensor 210, as well as to a signal reflected and received from the obstacle.

As illustrated in FIG. 7 or 11, when the transmitter 212 transmits a predetermined signal (s), a direct noise may be generated on the surface of the case 110 by the signal (s) generated by the transmitter 212, and the generated signal may be radiated through the sensor hole 202.

An ultrasonic wave transmitted from the transmitter portion 212 may refracted by the sensor hole 202 and transmitted to the sensor hole 204, and the direct noise may be generated by the refraction of the ultrasonic wave.

Afterwards, the signal (s) radiated through the sensor hole 202 may be reflected by the surfaces of the obstacles 5 and 6, and the reflected signal may be transmitted to the receiver 214 of the sensor hole 204 ((1), (2)).

In addition, the receiver 214 receives the direct noise (3) transmitted through the surface of the case 110.

At this time, even when the time at which the signal (1) reflected from the obstacle 5 is received by the receiver 214 is the same as the time at which the direct noise (3) is received by the receiver portion 214, the amplitudes of the signals (1) and (3) received by the receiver 214 are different from each other.

That is, the reflected signal (1) caused by the obstacle 5 is larger than the signal caused by the direct noise (3) because the amplitude of the reflected signal is attenuated when the direct noise (3) is transmitted along the case 110.

Therefore, the controller 180 of the cleaning robot 100 can discriminate between the signal (1) reflected by the obstacle 5 and the direct noise (3) by comparing the amplitudes of the received signals (1) and (3), even when the signals are received at the same time by the receiver 214.

Moreover, the controller 180 is able to discriminate more definitely whether the received signals (1) and (2) are signals reflected by the obstacles or not by comparing the amplitudes of the signals (1) and (2) reflected from the obstacles 5 and 6.

As illustrated in FIGS. 8, 9, and 12, the graph of FIG. 12 is a graph illustrating the correlation between the ratio of the depth Hh of the sensor holes 202 and 204 to the sensor diameter ds and the direct noise, the graphs shown illustrating the amplitude of the direct noise (3).

Hence, it can be seen in FIG. 12 that the amplitude of the direct noise is the smallest when the magnitude of the slope $\alpha$ is about 15 degrees, and that the greater the ratio Hh/ds between the length Hh of the sensor holes and the sensor diameter ds, the less the amplitude of the direct noise.

More particularly, it can be seen that the direct noise decreases at about 1.1 to about 1.8, which is the area where the measurement values are reduced. Preferably, the direct noise is the lowest in the range where the slope $\alpha$ is about 15 degrees and the ratio Hh/ds is about 1.6±0.2.

Moreover, as illustrated in FIGS. 8, 9, and 13, in the case that the slope a of the sensor holes 202 and 204 is positioned or provided at about 15 degrees, the greater the ratio dh/ds of the sensor diameter ds to the diameter dh of the inner opening 206, the less the amplitude of the direct noise (3) and the detection angle of an obstacle.

For example, the detection angle of an obstacle may be wide and the direct noise may be small. Thus, it can be seen that the direct noise decreases when the ratio dh/ds of the sensor diameter ds to the diameter dh of the inner opening 206 is about 0.3 to about 0.9, more preferably, determined within the range of about 0.5±0.1.

Furthermore, as illustrated in FIGS. 8, 9, and 14, it is advantageous that the detection angle of an obstacle is wide and the direct noise is low. Thus, the slope a of the sensor holes 202 and 204 can range from about 10 to about 22 degrees, or about 14±2 degrees.

Therefore, referring to the graphs of FIGS. 12 to 14, the slope of the sensor hole wall 203 forming the sensor holes 202 and 204 may be about 14±2 degrees and the ratio dh/ds of the sensor diameter ds to the diameter dh of the inner opening 206 may be about 0.5±0.1, and the ratio Hh/ds between the length Hh of the sensor holes and the sensor diameter ds may be about 1.6±0.2.

Hence, when the ultrasonic sensor 210 is installed in the sensor holes 202 and 204, as discussed above, the direct noise detected by the receiver 204 is reduced from the conventional 100 mV to less than 10 mV, and the controller 180 discriminates or is able to discern between the signal reflected from the obstacles and the direct noise because of the reduced amplitude of the direct noise.

Although this embodiment has been described with respect to an ultrasonic sensor as an example, the sensor unit is not limited to the ultrasonic sensor but may include any sensor configured to generate and receive a reflected signal.

Hereinafter, the procedure of discriminating or discerning between a signal reflected by an obstacle and a direct noise of a cleaning robot according to this embodiment will be described in more detail with reference to FIGS. 7 to 11.

First, the transmitter 212 of the ultrasonic sensor 210 transmits an ultrasonic wave, and a signal (s) generated by the transmitter 212 may be radiated, the radiation range thereof being restricted by the sensor hole 202.

The signal (s) radiated through the sensor hole 202 may be reflected from the obstacles 5 and 6 spaced away from the case 110, and the reflected signal may pass through the sensor hole 204, where the receiver 214 may be installed, and then received by the receiver 214. Part of the signal transmitted from the transmitter 212 may generate a direct noise (3), which may be transmitted to the receiver 214 along the case 110.

Thus, when the signal reflected from the obstacles 5 and 6 and received by the receiver 214 and the direct noise (3) received by the receiver 214 occur at the same time, the controller 180 of the cleaning robot may detect the direct noise (3) by comparing the amplitudes of the direct noise (3) and the reflected signals (1) and (2).

That is, when a voltage of the signal received by the receiver 214 is less than a predetermined voltage, the controller 180 determines that the received signal is a direct noise and ignores a signal of less than the predetermined voltage in the procedure of determining an obstacle.

Hence, when the obstacles 5 and 6 are detected through the receiver 214, even when different signals are received at approximately the same time, the controller 180 can determine whether these received signals are signals reflected from the obstacles or a signals caused by direct noise.

In other words, in this embodiment, it is possible to discriminate or discern a signal caused by the direct noise, and this leads to the effect of dissolution of an obstacle un-measurable area that is generated by the direct noise.

Figure 15:
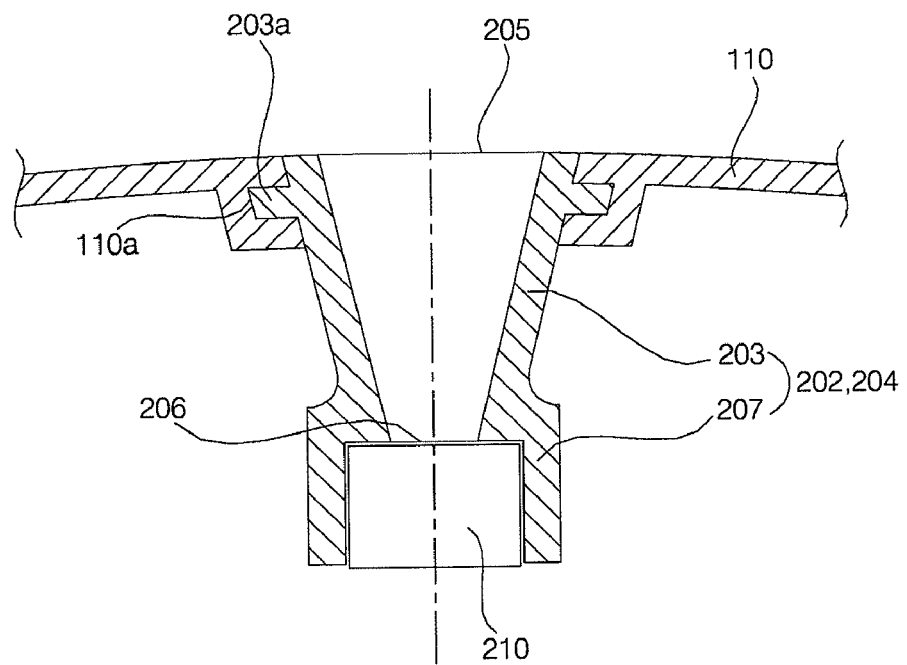
FIG. 15 is a cross sectional view illustrating a sensor hole of a cleaning robot according to another embodiment of the present invention.

FIG. 15 is a cross sectional view illustrating a sensor hole of a cleaning robot according to another embodiment of the present invention.

The sensor holes 202 and 204 of the cleaning robot 100 according to this embodiment may be provided so that they can be assembled (or mounted) in the case 110.

Thus, the sensor holes 202 and 204, the sensor hole wall 203 and the installation portion 207 may be assembled (or mounted) inside the case 110.

More particularly, in the case that the sensor holes 202 and 204 are formed of such a structure that is assembled in the case 110, as discussed above, the sensor holes 202 and 204 having the ultrasonic sensor 210 assembled therein may be assembled (or mounted) in the case 110, with the ultrasonic sensor 210 being pre-assembled in the installation portion 207, instead of, e.g., an assembly worker's installing the ultrasonic sensor 210 while checking the position of the installation portion 207 inside the case 110 during the manufacture of the cleaning robot 100. This improves the assembling properties of the worker.

In addition, protrusions 203a may be formed on the sensor hole wall 203 and grooves 110a formed on the case 110 may be inserted and assembled to each other. For example, the sensor holes 202 and 204 may be assembled in a downward direction from the upper side of the case 110.

Figure 16:
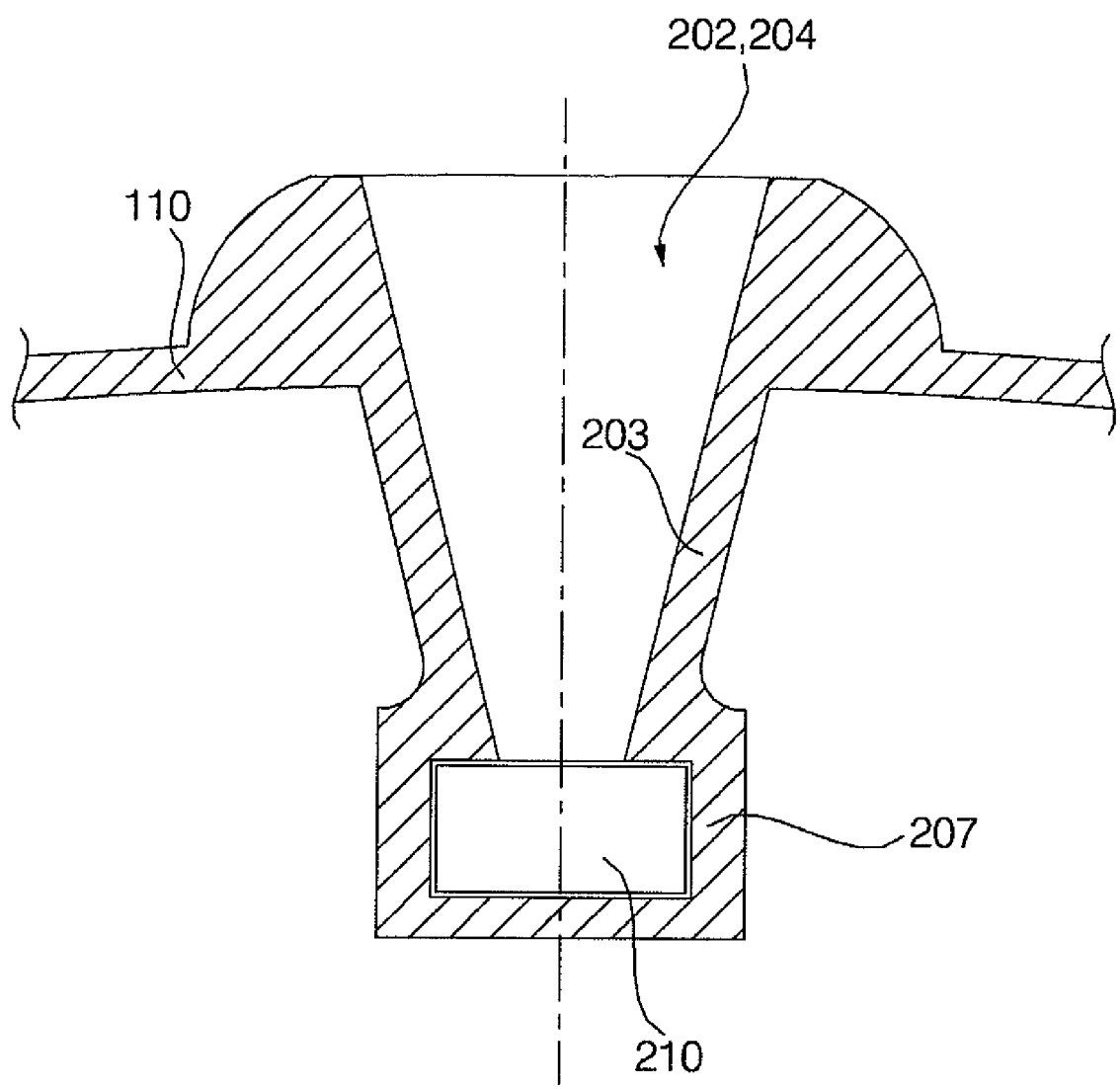
FIG. 16 is a cross sectional view illustrating a sensor hole of a cleaning robot according to still another embodiment of the present invention.
Figure 17:
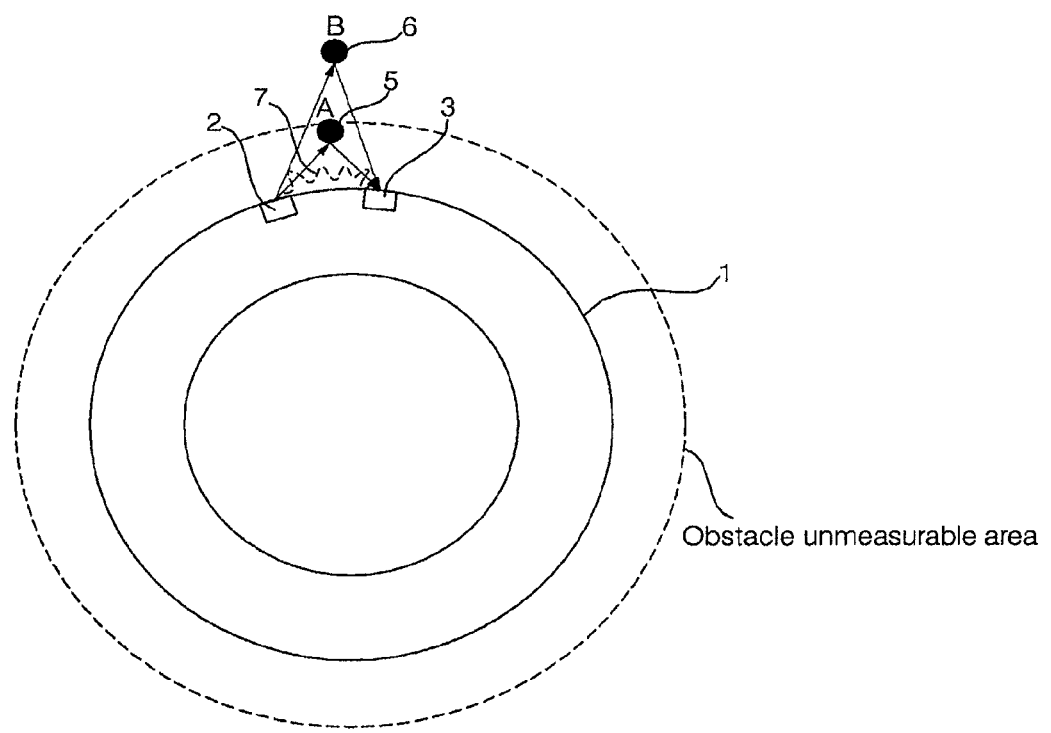
FIG. 17 is a schematic view where an ultrasonic sensor of a cleaning robot according to the conventional art is installed.
Figure 18:
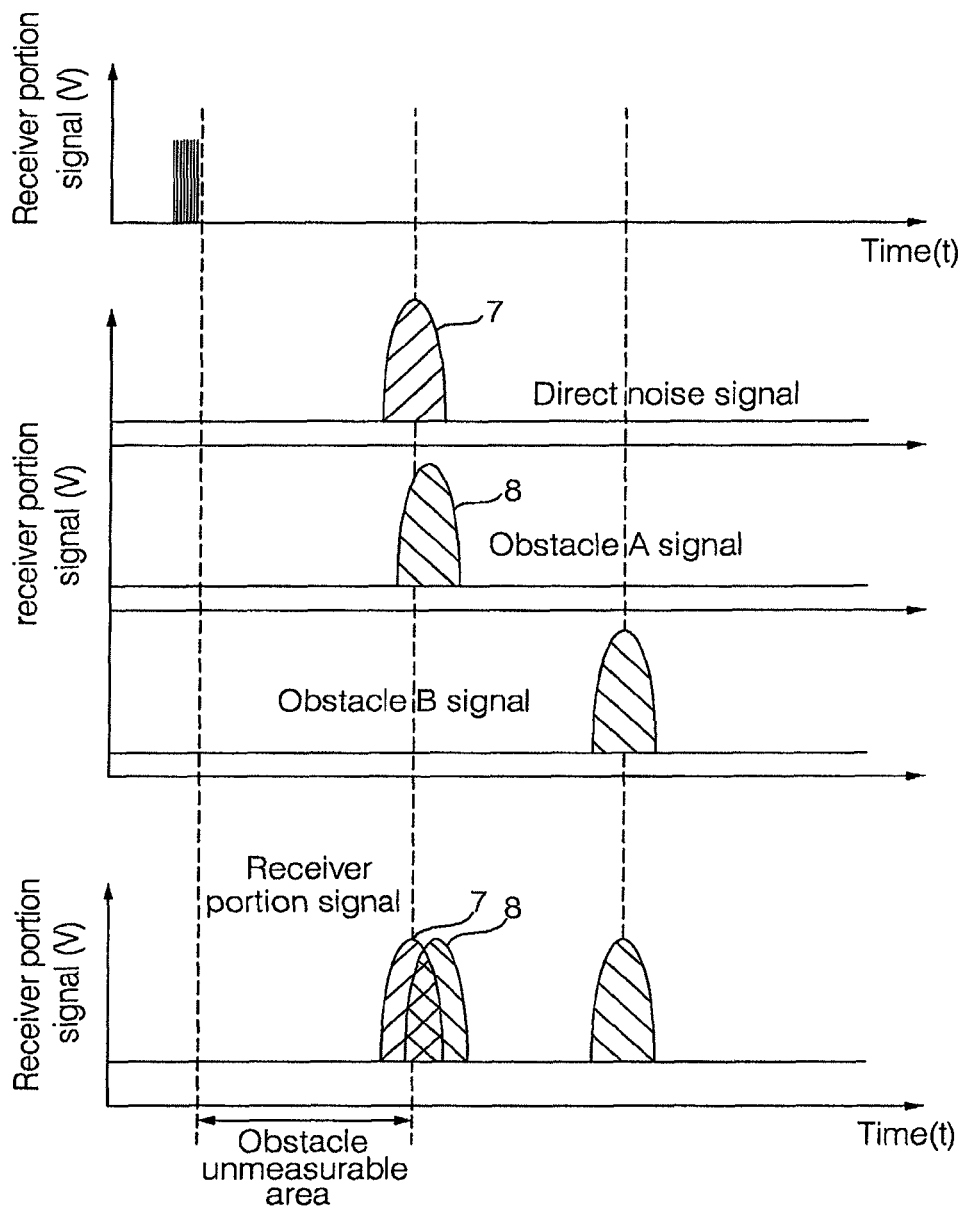
FIG. 18 is a graph illustrating a signal obtained by the ultrasonic sensor of FIG. 17.

FIG. 16 is a cross sectional view illustrating a sensor hole of a cleaning robot according to still another embodiment of the present invention.

The sensor holes 202 and 204 of the cleaning robot according to this embodiment are may be provided (or formed) as a protruding part which protrudes to the outside of the case 110.

Part of the sensor hole wall 203 may protrude out of the outer side of the case 110 and the orientation of the sensor hole 203 may be improved.

Moreover, in the case that one of the sensor holes 202 and 204 protrudes to the outside of the case 110 and the other one is at the same level as the outer surface of the case 110 or inserted into the inside thereof, the orientation of a signal transmitted or received through the sensor holes 202 and 204 can be further improved by a height difference between the sensor holes.

Furthermore, the installation portion 207 of the sensor holes 202 and 204 may be formed (or provided) by enclosing the part positioned inside the case 110 and so that the upper side or lower side of the case 110 is opened.

Hereinafter, the other components are identical to those of the first embodiment, so a detailed description thereof will be omitted.

The present invention shall not be limited by the embodiments and drawings disclosed in this specification but may be applicable by those skilled in the art without departing from the scope of protection of the true spirit of the invention.

Therefore, the present invention can dissolve (or eliminate) an obstacle un-measurable area, which cannot be detected because of the direct noise, by discriminating a signal caused by the direct noise and a signal transmitted from the transmitter portion depending on the amplitude of the signals among signals received by the receiver portion in the sensor unit including the transmitter portion and the receiver portion.

Additionally, the present invention can give orientation to the range of the transmitter and receiver of the sensor unit by inserting and installing the sensor unit including the transmitter and the receiver portion into the sensor holes of the case, and can easily compare a signal reflected from an obstacle and a signal caused by the direct noise by reducing the amplitude of the signal caused by the direct noise.

Moreover, the present invention provides a cleaning robot which minimizes the signal of the direct noise and maximizes the slope of the sensor holes.

Furthermore, the present invention minimizes the signal of the direct noise and provides the ratio of the sensor diameter to the diameter of the inner opening.

Further, the present invention minimizes the signal of the direct noise and the ratio of the sensor diameter to the length of the sensor holes.

What is claimed is:

1. A cleaning robot comprising:
   a case; and
   a sensor assembly, the sensor assembly comprising:
   a sensor hole having a first opening provided at an outer surface of the case, a second opening provided inwardly of the first opening, and a sensor mount provided inwardly of the second opening, with respect to a center of the case; and
   a sensor element configured to detect an obstacle, wherein the sensor element is at the sensor mount,
   wherein Hh defines a minimum distance from the first opening to the second opening, ds defines a diameter of the sensing element, and the ratio Hh/ds is about 1.1 to about 1.8.

2. The cleaning robot of claim 1, wherein the second opening has a cross-sectional area which is smaller than a cross-sectional area of a mount opening of the sensor mount.

3. A cleaning robot comprising:
   a case; and
   a sensor assembly, the sensor assembly comprising:
   a sensor hole having a first opening provided at an outer surface of the case, a second opening provided inwardly of the first opening, and a sensor mount provided inwardly of the second opening, with respect to a center of the case; and
   wherein the sensor hole further comprises:
   a sensor wall extending inwardly from the first opening to the second opening, an outer end of the sensor wall opening to an outer side of the case, and an inner end of the sensor wall opening to an interior of the case, and wherein the slope of the sensor wall, with respect to an axis passing through the centers of the first and second openings, is about 0.0 to about 18.0 degrees.

4. The cleaning robot of claim 3, wherein the second opening has a cross-sectional area which is smaller than a cross-sectional area of a mount opening of the sensor mount.

5. The cleaning robot of claim 3, wherein Hh defines a minimum distance from the first opening to the second opening, ds defines a diameter of the sensing element, and the ratio Hh/ds is about 1.1 to about 1.8.

6. The cleaning robot of claim 3, wherein dh defines a diameter of the second opening, ds defines a diameter of the sensing element, and the ratio dh/ds of the sensor is about 0.3 to about 1.0.

7. A cleaning robot comprising:

a case; and a sensor assembly, the sensor assembly comprising:

a sensor hole having a first opening provided at an outer surface of the case, a second opening provided inwardly of the first opening, and a sensor mount provided inwardly of the second opening, with respect to a center of the case; and a sensor element configured to detect an obstacle wherein the sensor element is provided at the sensor mount, wherein dh defines a diameter of the second opening, ds defines a diameter of the sensing element, and the ratio dh/ds of the sensor is about 0.3 to about 1.0.

8. The cleaning robot of claim 7, wherein Hh defines a minimum distance from the first opening to the second opening, ds defines a diameter of the sensing element, and the ratio Hh/ds is about 1.1 to about 1.8.

9. A cleaning robot comprising:

a case; and a sensor assembly, the sensor assembly comprising:

a sensor hole including a sensor wall which extends inwardly from a first opening provided at an outside of the case and a second opening provide at an inside of the case; and a sensing element including a transmitter and a receiver, wherein at least one of the transmitter and the receiver is provided inwardly of the first opening, wherein a protrusion is formed at the sensor wall and a groove into which the protrusion is inserted is formed at the case such that the sensor hole is assembled to the case.

10. A cleaning robot, comprising:

a case; and a sensor assembly, the sensor assembly comprising:

a sensing element which transmits or receives a predetermined signal; and a sensor hole provided on the case, the sensor hole having a sensor wall, a first opening provided at an outer surface of the case, and a second opening provided inwardly of the first opening with respect to a center of the case, wherein the sensor hole is configured to restrict a radiation range of the predetermined signal, wherein a protrusion is formed at the sensor wall and a groove into which the protrusion is inserted is formed at the case such that the sensor hole is assembled to the case.

11. The cleaning robot of claim 10, wherein the sensing element is provided inwardly of the first opening with respect to a center of the case.

12. The cleaning robot of claim 10, wherein a cross-sectional area of the sensor hole increases as the sensor hole extends from the second opening towards the first opening.

* * * * *